United States Patent
Lauzon

(10) Patent No.: US 6,286,853 B1
(45) Date of Patent: Sep. 11, 2001

(54) VEHICLE HITCH

(75) Inventor: Jacques Lauzon, Valcourt (CA)

(73) Assignees: Gerard Bisaillon, Magog; Rolland Bisaillon, Racine, both of (CA)

(*) Notice: Subject to any disclaimer, the term of this patent is extended or adjusted under 35 U.S.C. 154(b) by 0 days.

(21) Appl. No.: 09/431,932

(22) Filed: Nov. 1, 1999

(51) Int. Cl.⁷ .................................................. B60D 1/155
(52) U.S. Cl. ........................ 280/487; 280/513; 280/491.1; 267/138
(58) Field of Search ........................... 280/487, 486, 280/485, 484, 483, 513, 511, 491.1, 493, 494; 267/138

(56) References Cited

U.S. PATENT DOCUMENTS

| Re. 35,482 | * | 3/1997 | Johnson | 280/493 |
|---|---|---|---|---|
| 1,289,141 | * | 12/1918 | Ferris . | |
| 1,479,182 | * | 1/1924 | Jeschke . | |
| 1,510,257 | * | 9/1924 | Gribbins . | |
| 2,104,576 | * | 1/1938 | Zagelmeyer . | |
| 2,179,955 | * | 11/1939 | Rawnsley . | |
| 2,189,667 | * | 2/1940 | Kries . | |
| 2,237,031 | * | 4/1941 | Gilmore . | |
| 2,377,368 | * | 6/1945 | Polstra . | |
| 2,444,305 | * | 6/1948 | Milhizer . | |
| 2,513,932 | * | 7/1950 | Grube . | |
| 3,829,131 | * | 8/1974 | Moore, Jr. . | |
| 3,888,516 | * | 6/1975 | Holt et al. . | |
| 4,029,307 | * | 6/1977 | Nielson | 267/138 |
| 4,699,394 | * | 10/1987 | Laie | 280/493 |
| 4,978,133 | * | 12/1990 | Thorne et al. | 280/484 |
| 5,306,037 | * | 4/1994 | Robertson | 280/493 |

* cited by examiner

Primary Examiner—J. J. Swann
Assistant Examiner—F. Zeender
(74) Attorney, Agent, or Firm—George A. Seaby

(57) ABSTRACT

A vehicle hitch for interconnecting a pair of all terrain vehicles includes a pair of bars with socket couplers at one end of each bar for connecting the bars to the balls of conventional trailer hitches; and a damping mechanism releasably interconnecting the other ends of the bars and limiting longitudinal movement of the bars relative to each other. The bars are releasably locked together by a generally C-shaped pin, the arms of which are inserted through one end of a shaft extending out of one of the bars.

6 Claims, 4 Drawing Sheets

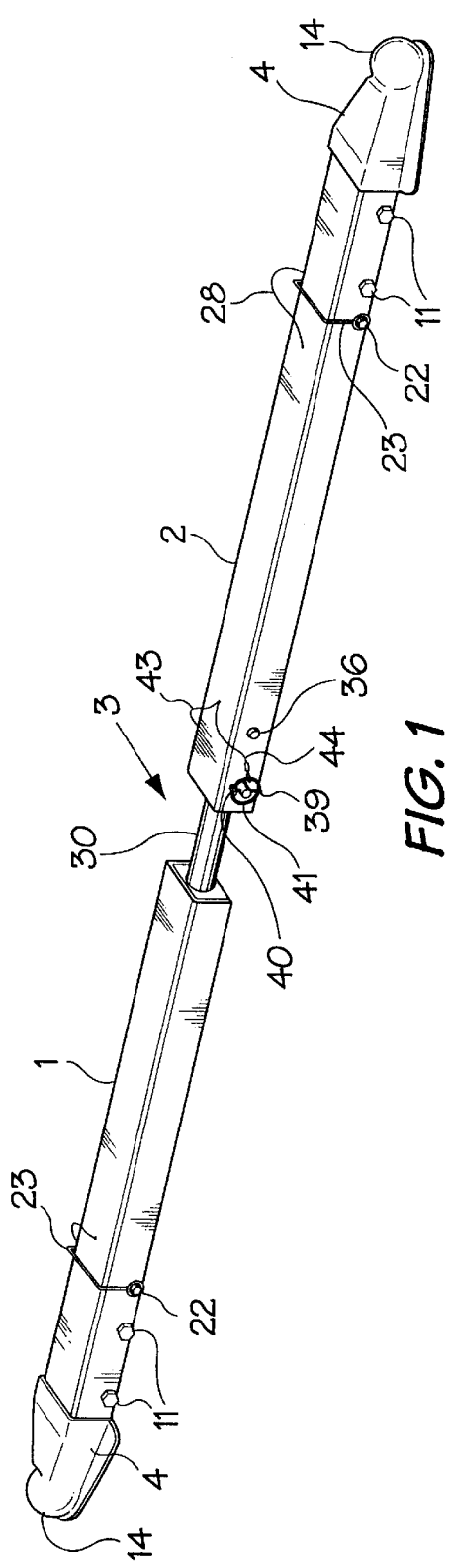
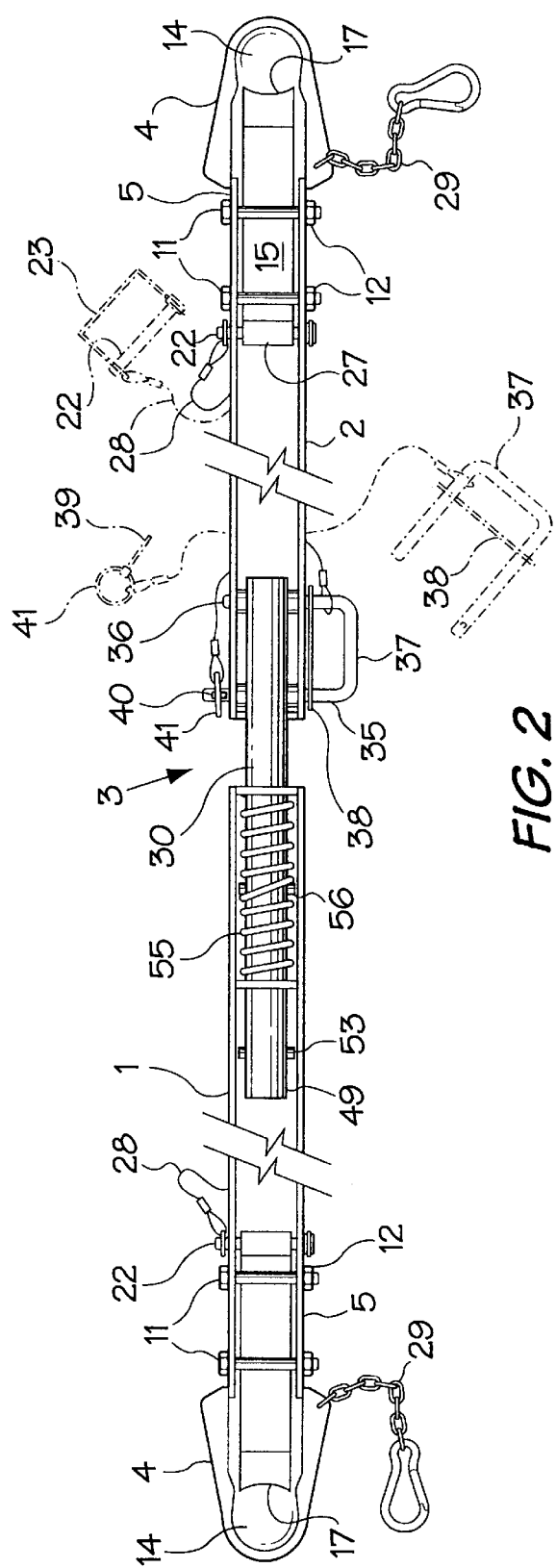

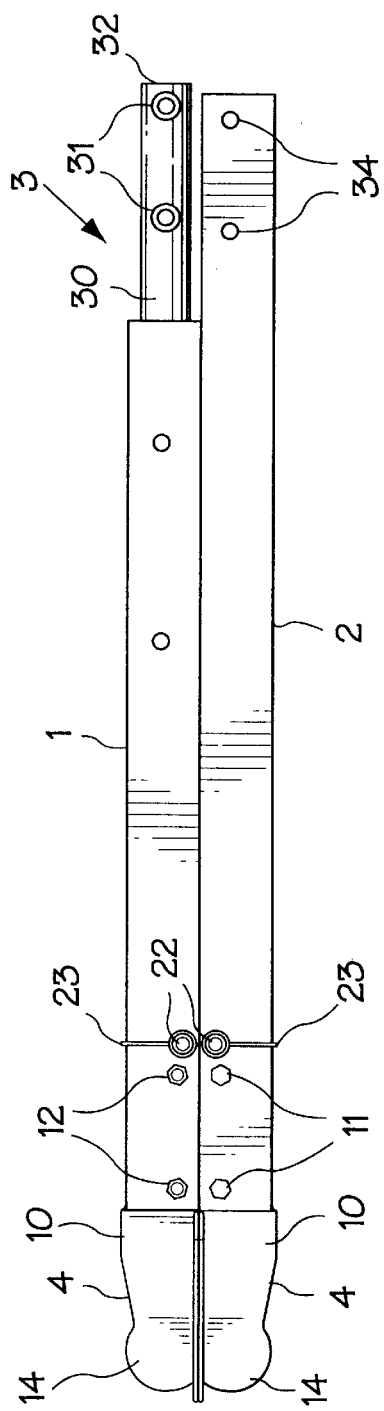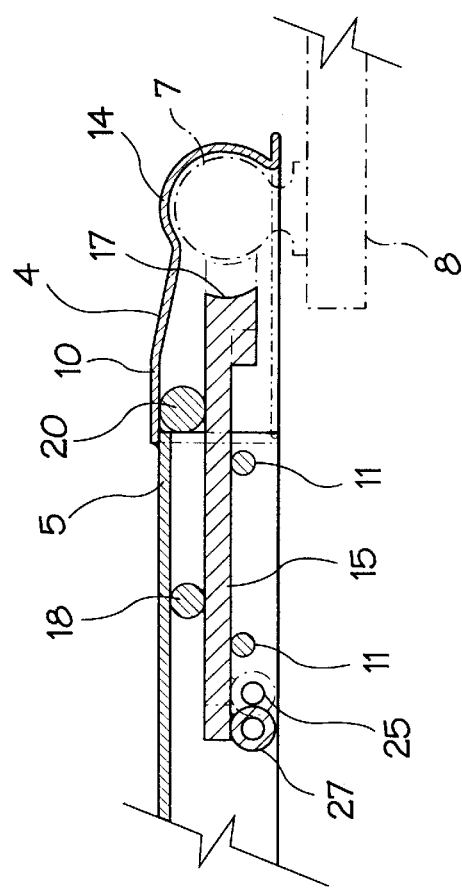

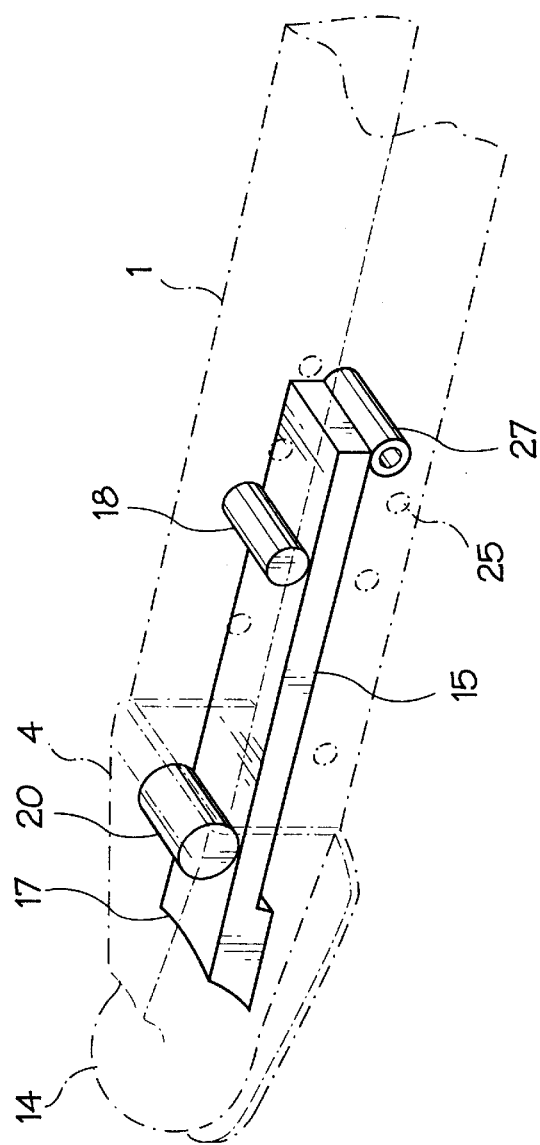
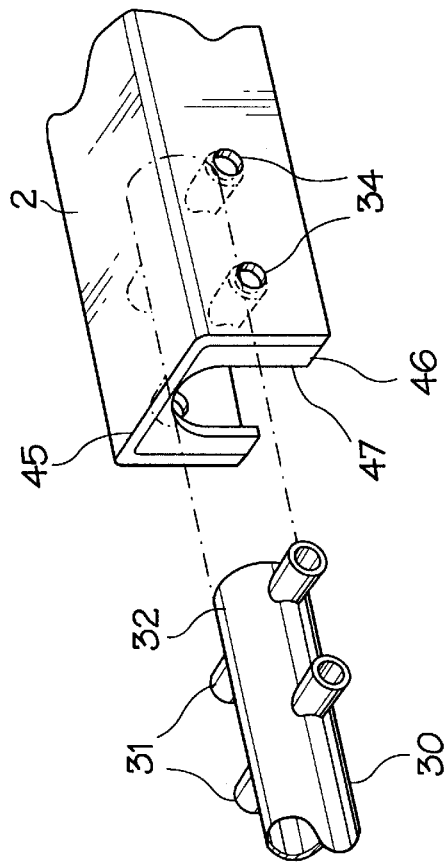
FIG. 5
FIG. 6

VEHICLE HITCH

BACKGROUND OF THE INVENTION

1. Field of the Invention

This invention relates to a vehicle hitch, and in particular to a hitch for coupling two vehicles for increased traction between the vehicles and the ground.

While the hitch of the present invention was designed specifically for use with all terrain vehicles (ATV's), it will be appreciated that the hitch can be used to couple other types of vehicles when increased traction is required.

2. Discussion of the Prior Art

All terrain vehicles have realized a substantial increase in popularity during the past decade. While such vehicles are mainly intended for recreational purposes, they are also used in many off-road commercial enterprises such as surveying, hydroelectric line repair and trapping. It has been found that in some conditions, e.g. swampy ground or when climbing hills, increased traction is required between the vehicle and the ground. The usual solution to the problem is to connect two vehicles together using a rope. Aside from the fact that rope tends to break when subjected to the forces involved when pulling a heavy vehicle, the use of a rope can lead to vehicle damage when the rope jerks one of the vehicles. Moreover, a rope cannot be used to push a vehicle from behind. Thus, when two or more vehicles are traveling together and the front vehicle becomes stuck, the use of a rope between two vehicles cannot be used to advance the front vehicle, but only to pull the latter rearwardly. The same problem exists when climbing a hill and the lead vehicle cannot get sufficient traction to complete the climb. Accordingly, a need exists for a hitch for use between two all terrain vehicles which can be used in pushing or pulling modes, without jerking.

A large number of vehicle hitches are described in the patent literature. Examples of such hitches, which have features in common with the present invention, are disclosed by U.S. Pat. No. 2,179,955, issued to W. Rawnsley on Nov. 14, 1939; U.S. Pat. No. 2,189,667, issued to J. Kries on Feb. 6, 1940; U.S. Pat. No. 2,513,932, issued to J. H. Grube on Jul. 4, 1950; U.S. Pat. No. 3,829,131, issued to G. E. Moore, Jr., on Aug. 13, 1974; U.S. Pat. No. 3,888,516, issued to L. G. Holt et al on Jun. 10, 1975; U.S. Pat. No. 4,978,133, issued to R. M. Thorne et al on Dec. 18, 1990; U.S. Pat. No. 5,306,037, issued to R. L. Robertson on Apr. 26, 1994 and U.S. Pat. No. Re. 35,482, issued to A. Johnson on Mar. 25, 1997.

In general, the patented hitches are intended solely for towing, i.e. cannot be used in pushing situations when both vehicles connected by the hitch are being driven. Moreover, most of the hitches described in the above mentioned patents have a single articulation, the connection between the hitch and the towed vehicle being fixed or rigid. In cases where there is more than one articulation, the structure is unduly complicated or not readily collapsed for carrying or storage.

GENERAL DESCRIPTION OF THE INVENTION

An object of the present invention is to provide a solution to the above problems in the form of a relatively simple vehicle hitch, which is readily assembled and disassembled, and which can be used to connect two vehicles under power for pushing or pulling one of the vehicles or for combining the traction of the vehicles with the ground.

Another object of the invention is to provide a vehicle hitch which is relatively compact when disassembled for packaging, storage or transporting.

Accordingly, the invention relates to a vehicle hitch for connecting a pair of vehicles comprising first and second elongated bars, coupling means on one end of each said first and second bars for joining said first and second bars to separate vehicles; damping means in a second end of said first bar permitting limited longitudinal movement of said first and second bars relative to each other, said damping means including shaft means extending out of said second end of the first bar for connecting said second end of said first bar to a second end of said second bar.

BRIEF DESCRIPTION OF THE DRAWINGS

The invention is described below in greater detail with reference to the accompanying drawings, which illustrate a preferred embodiment of the invention, and wherein:

FIG. 1 is an isometric view from above of a vehicle hitch in accordance with the present invention in the use or assembled condition;

FIG. 2 is a bottom view of the vehicle hitch of FIG. 1;

FIG. 3 is a side view of the vehicle hitch of FIGS. 1 and 2 in the disassembled condition;

FIG. 4 is a longitudinal sectional view of one end of the vehicle hitch of FIGS. 1 to 3;

FIG. 5 is an isometric view of a locking mechanism in the other end of the vehicle hitch of FIGS. 1 to 3;

FIG. 6 is an exploded, isometric view of the inner end of one section of the vehicle hitch of FIGS. 1 to 3.

DESCRIPTION OF THE PREFERRED EMBODIMENT

Figure 7:
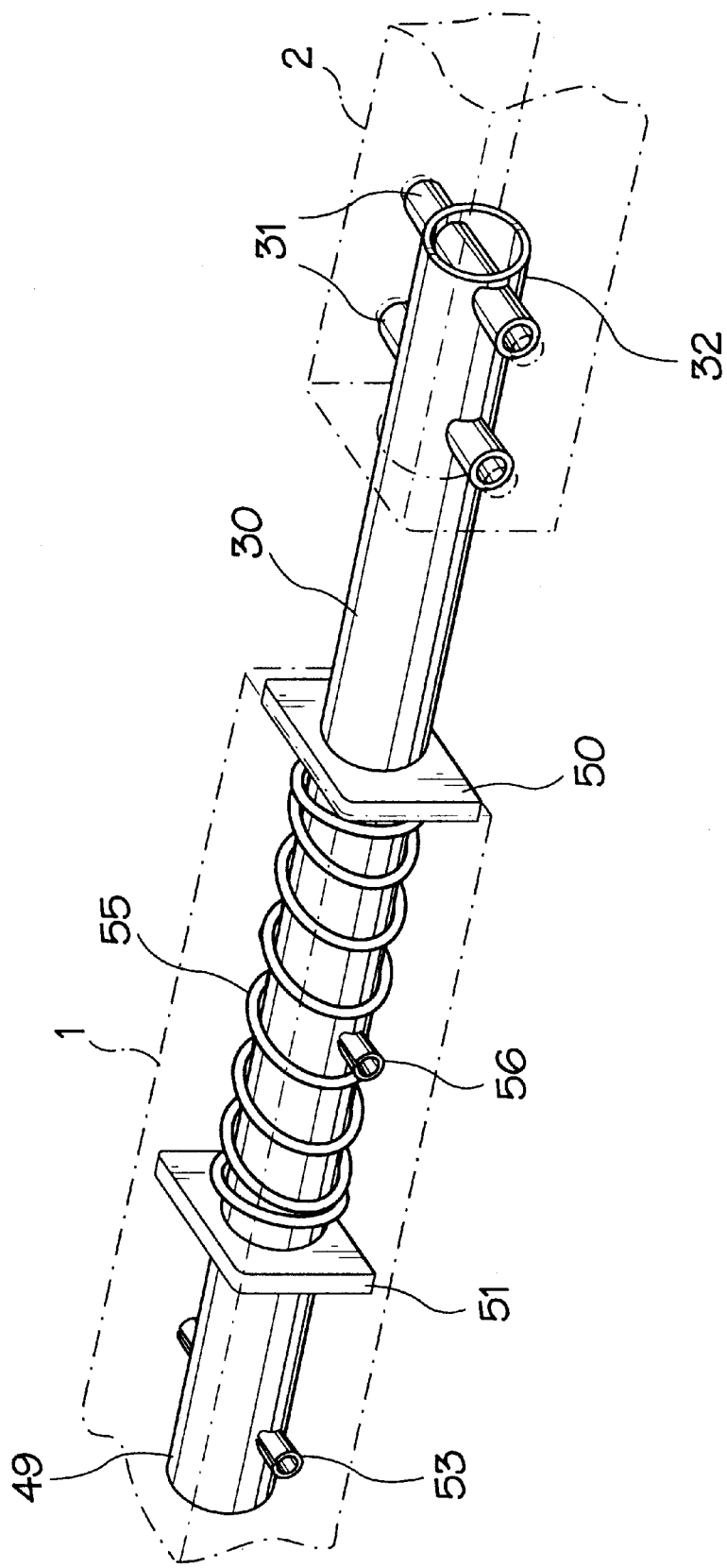
FIG. 7 is an isometric view of a shock absorber or damping mechanism used in the vehicle hitch of FIGS. 1 to 3.

With reference to FIGS. 1 to 3, the vehicle hitch includes a pair of similar steel bars 1 and 2, each having a generally inverted U-shaped cross section releasably interconnected in the use condition by a damping mechanism generally indicated at 3. As shown in FIG. 3, in the non-use condition, the bars 1 and 2 can be stacked in a compact form for packaging, storage or transporting.

A coupler 4 is provided in the outer free end 5 of each bar 1 and 2. The couplers 4 are used to connect the hitch to the balls 7 (FIG. 4) of standard trailer hitches 8 on the front or rear of a pair of vehicles (not shown). Each coupler 4 includes a hollow, rectangular cross section body 10 with an open bottom for mounting the coupler on the outer free end of a bar 1 or 2. The coupler body 10 is retained on the outer free end of the section 1 or 2 by a pair of bolts 11 and nuts 12. The outer end of the body 10 tapers to a generally hemispherical socket 14, which is placed over a ball 7 when connecting the hitch to a vehicle.

Referring to FIGS. 2, 4 and 5, the coupler 4 is locked in position by a latch mechanism in the form of a tongue 15 slidably mounted in the outer end 5 of each bar 1 and 2, and in the coupler body 10. A concave, sloping outer end 17 of the tongue 15 engages the ball 7 of the trailer hitch to prevent removal of the coupler 4 from the trailer hitch. The tongue 15 slides on the bolts 11 extending between the sides of the coupler body 10 near the open bottom end thereof. A pair of rods 18 and 20 extend transversely of the top of the tongue 15 for preventing vertical movement of the tongue in the coupler body. The outermost bar 20 which slides in the coupler body 10 acts as a stop to limit movement of the tongue 15 into the open outer end of the bar 1 or 2.

The tongue 15 is retained in the latched or locked position shown in phantom outline in FIG. 4 by a locking pin 22 and a generally C-shaped spring clip 23 (FIGS. 1 and 2). One end of the pin 22 is permanently connected to the clip 23. A loop on the other end of the clip 23 receives the other end of the pin. During locking, the loop end of the clip 23 is removed from the pin 22, the pin is pushed through aligned holes 25 (one shown—FIG. 4) in the sides of the free end 5 of the hitch bar 1 or 2 and a tube 27 on the bottom of the inner end of the tongue 15, the clip 23 is placed over such free end 5, and the clip 23 is flexed to place the loop 23 over the free end of the pin 22. The pin 22 and the clip 23 are permanently attached to the bar 1 or 2 by a retaining wire 28, so that when not in use they cannot become separated from the hitch assembly. The usual safety chain 29 is provided on the coupler 4 for connecting the latter to a loop (not shown) on the vehicle trailer hitch.

Referring to FIGS. 2, 6 and 7, the damping mechanism 3 includes an elongated, cylindrical shaft 30. A pair of smaller diameter sleeves 31 extend diametrically through the shaft 30 near one end 32 thereof. The end 32 of the tube 30 is inserted into one bar 2 of the hitch so that the sleeves 31 are aligned with holes 34 in the sides of the bar 2. The arms 35 and 36 of a generally U-shaped locking pin 37 are pushed through the holes 34 and the sleeves 31 to secure the end 32 of the tube 30 in the bar 2. A plate 38 extending between the arms 35 and 36 limits movement of the pin 37 to the locking position (FIG. 2). One arm 35 of the pin 37 is longer than the other arm 36 and includes a diametrically extending hole (not shown) for receiving a pin 39. The pin 39 is part of a locking mechanism. The pin 39 extends outwardly from a small block 40 and a loop 41, the ends of which are attached to the block 40 at spaced apart locations. When the loop 41 is rotated from the open position (shown in phantom outline in FIG. 2) to the closed position (FIG. 1) against the pin 39, there is a resistance to reverse movement of the loop. The pin 37 and the loop 41 are permanently connected to the hitch bar 2 by wires 43 and 44. The inner end 45 of the bar 2 is partially closed by an end wall defined by a plate 46 which includes a U-shaped notch 47 for receiving the tube 30. Should the locking pin 37 break or become dislodged, the plate 46 limits longitudinal movement of the tube 30 in a direction out of the bar 2. The plate 46 also facilitates proper positioning, i.e. centering of the shaft 30 in the end 45 of the bar 2.

The other end 49 of the tube 30 extends through a pair of spaced apart, fixed plates 50 and 51, one of which closes the inner end of the bar 1. The plates 50 and 51 are free to slide along the tube 30, i.e. the bar 1 can move towards and away from the bar 2 of the hitch. Movement of the bar 1 towards bar 2 is limited by a split, spring pin 53 extending diametrically through the tube 30 near the end 49 thereof.

A helical spring 55 is mounted on the tube 30 between the plates 50 and 51. A split pin 56 extends through the shaft 30 and through the approximate middle of the spring 55. When a force is applied to one of the bars 1 or 2 tends to push the sections together, the portion of the spring 55 between the plate 50 and the pin 56 is compressed. When the force tends to move the bars 1 and 2 apart, the portion of the spring 55 between the pin 56 and the plate 51 is compressed. In both cases, the movement of the bars 1 and 2 relative to each other is dampened, so that there is no sudden jerking of the pulling or pushing vehicle.

As shown in FIG. 3, the length of the bar 1 and the portion of the shaft 30 extending outwardly therefrom are approximately equal to the length of the bar 2, making the disassembled hitch compact for packaging and storage. In order to assemble the hitch, it is merely necessary to place the end 32 of the shaft 30 in the end 45 of the bar 2, so that the sleeves 31 are aligned with the holes 34. The arms 35 and 36 are pushed through the holes 34 and the sleeves 31 and locked in place using the pin 39. This procedure is reversed when disassembling the hitch.

When the hitch is used to couple a pair of all terrain vehicles, and one of the vehicles become stuck, for example in snow or mud, if the vehicles are hitched together using the hitch of the present invention, one vehicle can be used to push or pull the other vehicle. Since both vehicles are in operation, there is no question of jackknifing once the stuck vehicle becomes unstuck. The hitch can also be used to improve traction when climbing a hill. With two vehicles coupled, the traction when climbing a hill is increased by virtue of the fact that there are double the number of wheels in contact with the ground as compared to a single vehicle, and twice the number of wheels are being driven.

I claim:

1. A vehicle hitch for connecting a pair of vehicles comprising first and second elongated bars, each said bar having a pair of sides, a closed top and an open bottom; coupling means on one end of each said first and second bars for joining said first and second bars to separate vehicles, damping means in and closing a second end of said first bar permitting limited longitudinal movement of said first and second bars relative to each other, said damping means including shaft means extending out of and slidable in said second end of said first bar for extending into a second end of said second bar, and helical spring means on said shaft means in said second end of said first bar for damping movement of said shaft means and consequently of said second bar relative to said first bar; and removable locking pin means for extending through a second end of said second bar into said shaft means for releasably coupling said first and second bars.

2. The vehicle hitch of claim 1, wherein said coupling means includes socket means for mounting on a trailer hitch ball; tongue means slidable in said socket means for engaging the ball to lock the socket means on the ball; and latch means for locking the tongue means in a ball engaging position.

3. The vehicle hitch of claim 1, wherein said damping means includes spaced apart stop plates in said second end of said first bar for slidably supporting said shaft means; and spring pin means in said shaft means extending into said spring means intermediate the ends thereof, whereby longitudinal movement of said shaft means in either direction causes compression of said spring means between said spring pin means and one said stop means to dampen such movement of said shaft means and consequently of said first and second bars.

4. The vehicle hitch of claim 1, including an end wall on the second end of said second bar; and a notch in said end wall for receiving said shaft means and centering the shaft means in said second bar.

5. The vehicle hitch of claim 1, including a pair of spaced apart holes in each side of said second bar proximate said second end thereof, and a pair of spaced apart sleeves in said shaft means for alignment with said holes, said locking pin means including a pair of arms for insertion through said sleeves and holes when releasably coupling said first and second bars.

6. The vehicle hitch of claim 5, wherein, in the disassembled condition of the hitch, the overall length of said first bar means and the shaft means extending from the second end thereof is equal to the length of said second bar means, whereby the first and second bar means can be stacked in a compact form for packaging, storage and transporting.

* * * * *